United States Patent
Hogan et al.

(10) Patent No.: US 6,838,539 B2
(45) Date of Patent: Jan. 4, 2005

(54) CUREABLE SILANE FUNCTIONALIZED SEALANT COMPOSITION AND MANUFACTURE OF SAME

(75) Inventors: Terrence E. Hogan, Akron, OH (US); David F. Lawson, Uniontown, OH (US); Takayoki Yako, Copley, OH (US); J. P. Kennedy, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 36 days.

(21) Appl. No.: 10/074,907

(22) Filed: Feb. 12, 2002

(65) Prior Publication Data

US 2003/0153707 A1 Aug. 14, 2003

(51) Int. Cl.⁷ .............................................. C08F 212/08
(52) U.S. Cl. ........................................................ 526/347
(58) Field of Search ................................ 526/347, 279

(56) References Cited

U.S. PATENT DOCUMENTS

| | | |
|---|---|---|
| 4,463,129 A | 7/1984 | Shinada et al. |
| 4,543,403 A | 9/1985 | Isayama et al. |
| 4,788,254 A | 11/1988 | Kawakubo et al. |
| 4,829,130 A | 5/1989 | Licchelli et al. |
| 4,837,274 A | 6/1989 | Kawakubo et al. |
| 4,837,401 A | 6/1989 | Hirose et al. |
| 4,870,144 A | 9/1989 | Noda et al. |
| 4,904,732 A | 2/1990 | Iwahara et al. |
| 4,906,695 A | 3/1990 | Blizzard et al. |
| 5,075,377 A | 12/1991 | Kawabuchi et al. |
| 5,120,379 A | 6/1992 | Noda et al. |
| 5,169,914 A | 12/1992 | Kaszas et al. |
| 5,247,021 A | 9/1993 | Fujisawa et al. |
| 5,262,502 A | 11/1993 | Fujisawa et al. |
| 5,290,873 A | 3/1994 | Noda et al. |
| 5,421,866 A | 6/1995 | Stark-Kasley et al. |
| 5,447,990 A | 9/1995 | Noda et al. |
| 5,527,870 A | 6/1996 | Maeda et al. |
| 5,580,925 A | 12/1996 | Iwahara et al. |
| 5,627,252 A | 5/1997 | De La Croi Habimana |
| 5,728,791 A | 3/1998 | Tamai et al. |
| 5,733,975 A | 3/1998 | Aoyama et al. |
| 5,739,267 A | 4/1998 | Fujisawa et al. |
| 5,777,037 A | 7/1998 | Yamanaka et al. |
| 5,811,501 A | 9/1998 | Chiba et al. |
| 5,834,563 A | 11/1998 | Kimura et al. |
| 5,849,847 A | 12/1998 | Quirk |
| 5,855,972 A | 1/1999 | Kaeding |
| 6,011,116 A | 1/2000 | Aoyama et al. |
| 6,020,446 A | 2/2000 | Okamoto et al. |
| 6,025,416 A | 2/2000 | Proebster et al. |
| 6,025,445 A | 2/2000 | Chiba et al. |
| 6,060,559 A | 5/2000 | Feng et al. |
| 6,087,456 A | 7/2000 | Sakaguchi et al. |
| 6,106,953 A | 8/2000 | Zimmermann et al. |
| 6,121,379 A | 9/2000 | Yamanaka et al. |
| 6,268,451 B1 * | 7/2001 | Faust et al. .................. 526/279 |
| 6,277,304 B1 | 8/2001 | Wei et al. |
| 6,348,546 B2 | 2/2002 | Hiiro et al. |

FOREIGN PATENT DOCUMENTS

| | | |
|---|---|---|
| EP | 0 255 170 A1 * | 2/1988 |
| EP | 1 099 728 A1 | 5/2001 |
| EP | 1 134 251 A1 | 9/2001 |
| WO | WO 00/75226 A1 | 12/2000 |
| WO | WO 01/87999 A2 * | 11/2001 |

OTHER PUBLICATIONS

Greenwood, N.N.; Earnshaw, A., Chemistry of the Elements, pp 1126–1127, Pergaroen Press, New York 1984.

* cited by examiner

Primary Examiner—Robert D. Harlan
(74) Attorney, Agent, or Firm—Scott A. McCollister; Meredith E. Palmer

(57) ABSTRACT

The present invention is directed to a method of forming a polymer composition having quaternary alkane units and aromatic hydrocarbon units. The aromatic hydrocarbon units have substituents of the general formula $R^1SiR^2R^3R^4$, wherein $R^1$ is optional and is a hydrocarbon or ether linking the silicon and the aromatic hydrocarbon, and $R^2$, $R^3$, and $R^4$ are one or more of hydrogen, alkyl, and alkoxy, with the provision that no more than two may be hydrogen or alkyl.

15 Claims, No Drawings

CUREABLE SILANE FUNCTIONALIZED SEALANT COMPOSITION AND MANUFACTURE OF SAME

BACKGROUND OF THE INVENTION

The present invention is broadly directed to the preparation of polyisobutylene sealants.

Polymers such as polyisobutylene have found applications in building sealants due to an inherent air and moisture impermeability. To function as a sealant, a curable group is usually combined with the isobutylene units, resulting in, for example, alkoxy-silane functionalized polyisobutylene. Current polyisobutylene building sealants are often formed using a two-step process. The polymer backbone is formed and endcapped with a reactive functional group. The reactive functional group is then reacted, often in the presence of a metal catalyst, resulting in the presence of a curable group on the polymer backbone. In one specific example, the polymer is endcapped with allyl groups through the use of allyltrimethylsilane. Then, the allyl group is hydrosilylated using a platinum catalyst and an appropriate silane. In another method, the reactive functional groups are dispersed throughout the polymer backbone, followed by the reaction of the functional groups to form curable siloxane groups within the polymer backbone. This two-step process is both expensive and cumbersome.

In U.S. Pat. No. 4,829,130, a method is provided for forming silylated derivatives of polyisobutene. The method includes copolymerizing isobutene with an unsaturated comonomer containing halo-silane functionality. The polymerization is initiated by Lewis acid catalysts, with the preferred catalyst being $AlCl_3$. Once the copolymerization is complete, an aliphatic alcohol containing 1 to 5 carbon atoms is added to convert the chloro-silane groups in the polymer backbone to alkoxy-silane groups. The polymer thus formed is an alkoxy-silane functionalized copolymer including isobutene monomer units and alkoxy-silane functionalized comonomers. The process to synthesize the copolymer requires that the monomers not contain functional groups that may interfere with the polymerization catalyst. That an alkoxy silane functionalized monomer was not directly polymerized with isobutene indicates the recognition in the art that the employed Lewis acid catalyst may react with ethers, ketones, amines, imines, nitrides and thioethers. Accordingly, and as evidenced in U.S. Pat. No. 4,829,130, the direct copolymerization of isobutylene with an alkoxy functionalized comonomer would not be contemplated.

It would be desirable to have available a less expensive, more efficient process to directly prepare alkoxysilane functionalized polyisobutylene with lower polydispersity.

SUMMARY OF THE INVENTION

The present invention is directed to a method for forming a building sealant by co-polymerization of tertiary alkene monomer and vinyl aromatic hydrocarbon monomer including substituents of the general formula $R^1SiR^2R^3R^4$, wherein $R^1$ is optional and is a hydrocarbon or ether linking the silicon and the vinyl aromatic, and $R^2$, $R^3$, and $R^4$ are one or more of hydrogen, alkyl, and alkoxy, with the proviso that no more than two may be hydrogen or alkyl. The present invention is also directed to a polymer composition formed via the above method.

DETAILED DESCRIPTION OF THE PREFERRED EMBODIMENTS

The present invention is directed to the formation of a sealant prepared by the use of tertiary alkene units. The sealant also includes vinyl aromatic hydrocarbon units including substituents of the general formula $R^1SiR^2R^3R^4$. The one step copolymerization with vinyl aromatic hydrocarbon units including substituents facilitates the formation of the sealant by reducing the number of steps required to form the sealant. Moreover, the desired curing groups are attached to the polymer chain by the addition of vinyl aromatic units during polymerization of the backbone.

The polymer composition thus formed includes a quaternary alkane backbone. The backbone preferably has a number average molecular weight ($M_n$) between about 1000 and 100,000, more preferably between about 1000 and 25,000, most preferably between about 5000 and 25,000. Furthermore, the backbone is preferably linear, but may be crosslinked to form branched structures. Suitable tertiary alkene monomers are one or more of isobutylene, 2-methylbutene, 2-methylpentene, and 2-methylhexene. A preferred tertiary alkene is isobutylene.

The vinyl aromatic hydrocarbon monomer is preferably dispersed throughout the polymer backbone. Additionally, the backbone may be endcapped with the vinyl aromatic hydrocarbon monomer. Suitable vinyl aromatic hydrocarbon monomers include one or more of styrene, α-methylstyrene, 1-vinylnaphthalene, 2-vinylnaphthalene, 1-α-methylvinylnaphthalene, 2-α-methylvinylnaphthalene, as well as alkyl, cycloalkyl, aryl, alkaryl, and aralkyl derivatives thereof, in which the total number of carbon atoms in the combined hydrocarbon is generally not greater than 18.

The vinyl aromatic hydrocarbon monomers include substituents of the general formula $R^1SiR^2R^3R^4$, as demonstrated by one exemplary styryl structure set forth below:

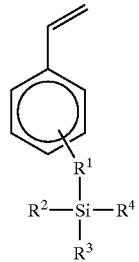

The substituents may be attached to the aromatic portion of the vinyl aromatic hydrocarbon in any of the meta, ortho, or para positions. In these styryl derivatives, the para position is preferred. The $R^1$ group is optional, and where implemented, includes one or more of a $C_1$ to $C_8$ alkyl group or ether, preferably a $C_1$ to $C_5$ alkyl group or an ether. The $R^1$ group forms a linkage between the vinyl aromatic hydrocarbon and the silane group, however if $R^1$ is an ether, the part of the $R^1$ group attached to Si should be alkyl. Alternatively, the silicon may be attached directly to the vinyl aromatic hydrocarbon. Of course, the invention also includes napthalene and other vinyl aromatic monomers wherein the $R^1SiR^2R^3R^4$ substituent can be attached at any ring position.

$R^2$, $R^3$, and $R^4$ are independently selected and are one or more of hydrogen, hydrocarbon, and alkoxy groups. No more than two of $R^2$, $R^3$, and $R^4$ may be hydrogen or hydrocarbon. Suitable alkoxy groups include methoxy, ethoxy, propoxy, butoxy, pentoxy and other alkoxy groups with up to about 10 carbons, and mixtures thereof. Suitable hydrocarbon groups include methyl, ethyl, propyl, butyl, pentyl, hexyl, heptyl, octyl, nonyl, decyl, and mixtures thereof. Hydrocarbon groups may be linear or branched, and are preferably saturated. Preferred substituted vinyl aromatic hydrocarbons include styrylethyltrimethoxy silane, styrylethyldimethoxy silane, styrylethylmethoxydimethyl silane, and mixtures thereof.

The polymerization reaction can be initiated by a carbenium ion. Typical methods for generating suitable carbenium ions are by reaction of alkyl halides with Lewis acids or reaction of Bronsted acids with an alkene. In the Lewis acid system, the polymerization is initiated by the presence of an alkyl halide and a Lewis acid, the former may be referred to herein as initiator and the latter as co-initiator. Accordingly, the Lewis acid and alkyl halide may be first combined and added to the vinyl aromatic and tertiary alkene monomers and or added thereto separately in any order. The preferred method is to add the alkyl halide to the monomers and then add the Lewis acid. Multifunctional initiators may be synthesized using polyhalogenated species and a Lewis acid. Preferred initiator systems include Lewis acids, such as $TiCl_4$, $BCl_3$, $AlCl_3$, $Et_2AlCl$, $EtAlCl_2$, and mixtures thereof, and an alkyl halide from the list $\alpha,\alpha,\alpha',\alpha'$ tetramethyl-1,4-benzene dimethyl chloride, t-butyl chloride, t-butyl bromide, 2-chloro-2-phenylpropane, 2-bromo-2-phenylpropane, 2-chloro-2-methylpentane, 2-bromo-2-methylpentane, 2-chloro-2-methylbutane, 2-bromo-2-methylbutane, 1,3-(2-chloro-2-propyl)-5-t-butyl benzene and 1,3-(2-bromo-2-propyl)-5-t-butyl benzene, and mixtures thereof. A preferred initiator system is $\alpha,\alpha,\alpha',\alpha'$ tetramethyl-1,4-benzene dimethyl chloride and titanium tetrachloride.

It is known that Lewis acids, particularly $TiCl_4$, will react with oxygen containing species. Accordingly, since an alkoxy group is a required constituent of the copolymerized vinyl aromatic monomers, one skilled in the art may expect this to deactivate Lewis acid catalysts. Surprisingly, this does not occur in the present polymerization. As a result, $TiCl_4$ co-initiation of the copolymerization of tertiary alkene monomers and alkoxy-silane substituted vinyl aromatic hydrocarbons provides an efficient, one-step polymerization process.

The polymerization is preferably carried out at low temperatures, such as below about 0° C., more preferably below about −20° C., and most preferably below about −50° C., under an inert atmosphere, such as $N_2$ or Ar. The initiator is added to a charge of substituted vinyl aromatic hydrocarbon monomer and tertiary alkene monomer in a polymerization vessel and living polymerization is initiated by addition of the co-initiator. The alkyl halide is added in an amount of about 0.001 to 0.1 mol per 100 grams tertiary alkene monomer, more preferably between about 0.004 and 0.1 mol per 100 grams monomer, most preferably between about 0.004 and 0.02 mol per 100 grams monomer. The polymerization is allowed to continue until substantially 100% of monomer conversion is completed. The polymerization can be terminated by the addition of a terminator, such as an alcohol, although other terminators known in the art would also be suitable. The resulting polymers are alkoxysilane-modified polyisobutylene. The polymer compositions thus formed may be telechelic and/or may include random polymerization of the tertiary alkene and vinyl aromatic hydrocarbon monomer units.

The polymer preferably has a $M_n$ range of about 1000 to about 100,000, more preferably between about 1000 and 25,000, most preferably between about 5000 and 25,000 as measured by gel permeation chromatography (GPC) using universal calibration and the following Mark-Houwink constants for polyisobutylene: K=0.000085, $\alpha$=0.75. Tertiary alkene monomer contributed units preferably comprise between about 46.6 and 99.5 wt % of the total polymer composition, more preferably between about 89.3 and 97.9 wt % of the total polymer composition, while the substituted vinyl aromatic contributed units comprise between about 54.4 and 0.5 wt % of the total polymer composition, more preferably between about 10.7 and 2.1 wt %.

The polymer composition preferably has a low polydispersity. Polydispersity may be controlled using methods described in U.S. Pat. No. 5,169,914. Preferably, the polydispersity is less than about 2.0, more preferably less than about 1.5.

The polymerization process described herein reduces the number of steps required to form a moisture-curable functionalized polyisobutylene suitable for use as a building sealant. The moisture-curable polyisobutylene may then be mixed with filler and a moisture source. A curing step may occur at the alkoxysilane groups located throughout the polymer backbone. The alkoxysilane groups are hydrolyzed to silanol groups by moisture. The silanol groups then condense to form siloxane crosslinks between silanol groups. Once the curing step is completed, the polymer composition acts as a sealant against further moisture and air permeation.

In the following, the present invention will be described in more detail with reference to a non-limiting example. The following examples are presented for purposes of illustration only and are not to be construed in any limiting sense.

EXAMPLES

Synthesis of Initiator 400 mL of $CH_2Cl_2$ and 41.68 g (0.215 mol) $\alpha,\alpha,\alpha',\alpha'$-tetramethyl-1,4-benzene dimethanol (99%, Aldrich) were added to a nitrogen purged, 3-necked 1000 mL round bottom flask equipped with a reflux condensor with stirring. To this solution was slowly added 31.3 mL (0.215 mol) of thionyl chloride (99+%, Aldrich) over 15 minutes. After 12 hours, the solution was rotary evaporated yielding white crystals of $\alpha,\alpha,\alpha',\alpha'$-tetramethyl-1,4-benzene dimethylchloride. The product was recrystallized twice from hexane and stored at −20° C. until used. Directly prior to use, the crystals were recrystallized once more from hexane to obtain $\alpha,\alpha,\alpha',\alpha'$-tetramethyl-1,4-benzene dimethylchloride: mp=69–70° C., $^1$H-NMR(CDCl$_3$): 7.56 ppm, 4H, s; 1.99 ppm, 12H, s.

Example 1

Synthesis of Poly(styrylethyltrimethoxysilane-co-isobutylene)

173.2 g of 23.1 weight percent isobutylene in hexane and 272.6 g of methyl chloride (AGA Gas) were added to a $N_2$ purged, 800 mL glass bottle. Then, the bottle was cooled to −78° C. and 1.5 mL (16.13 mmol) dimethyl acetamide (99.8%, Aldrich), 0.8 mL (3.56 mmol) of 2,6-di-t-butylpyridine (97%, Aldrich), 2.84 g (5.34 mmol), styrylethyltrimethoxysilane (95%, Gelest), and 0.617 g (2.67 mmol) of $\alpha,\alpha,\alpha',\alpha'$-tetramethyl-1,4-benzenedimethyl chloride initiator were added. Polymerization was initiated by addition of 2×4 mL (72.95 mmol) of $TiCl_4$ (99.9%, Aldrich). The polymerization temperature rose to −55.7° C. after 3 minutes. After a total reaction time of 45 minutes, the polymerization was terminated with 20 mL of anhydrous MeOH. The bottle was warmed to room temperature and purged with nitrogen overnight. The product was then extracted 3×20 mL MeOH, and 21.4 g of anhydrous aliphatic plasticizer (a mixture of C12–C18 linear alkanes) and 0.642 g of 1-trimethyl siloxy-2,2-di(methylene trimethyl siloxy) butane was added. The remaining solvent was removed by vacuum distillation to yield a material with the following properties: $T_g$=−77.2° C., $M_n$=2.64×10$^4$ g/mol, $M_w$=3.46×10$^4$ g/mol, PDI=1.31.

Example 2
Synthesis of Poly(styrylethyltrimethoxysilane-co-isobutylene)

173.2 g of 23.1 weight percent isobutylene in hexane and 272.6 g of methyl chloride (AGA Gas) were added to a $N_2$ purged, 800 mL glass bottle. Then, the bottle was cooled to −78° C. and 1.5 mL (16.3 mmol) dimethylacetamide, 0.8 mL (3.56 mmol) of 2,6-di-t-butylpyridine, 2.84 g (5.34 mmol) of styrylethyltrimethoxy silane, and 0.992 g (4.28 mmol) of α,α,α',α'-tetramethyl-1,4-benzenedimethyl chloride initiator were added. Polymerization was initiated by adding of 2×4 mL (72.95 mmol) of $TiCl_4$. The polymerization temperature rose to −52.7° C. after 3 minutes. After a total reaction time of 45 minutes, the polymerization was terminated with 20 mL of anhydrous MeOH. The bottle was warmed to room temperature and purged with nitrogen overnight. The product was then extracted 3×20 mL MeOH, and 21.4 g of anhydrous aliphatic plasticizer (a mixture of $C_{12}$–$C_{18}$ linear alkanes) and 0.642 g of 1-trimethyl siloxy-2,2-di(methylene trimethyl siloxy) butane was added. The remaining solvent was removed by vacuum distillation to yield a material with the following properties: $M_n=1.44\times10^4$ g/mol, $M_w=1.92\times10^4$ g/mol, PDI=1.33.

Example 3
Synthesis of Poly(styrylethyltrimethoxysilane-co-isobutylene)

173.2 g of 23.1 weight percent isobutylene in hexane and 272.6 g of methyl chloride (AGA Gas) were added to a $N_2$ purged, 800 mL glass bottle. Then, the bottle was cooled to −78° C. and 1.5 mL (16.13 mmol) dimethylacetamide (Aldrich), 0.8 mL (3.56 mmol) of 2,6-di-t-butylpyridine (Aldrich), 2.84 g (5.34 mmol) of styrylethyltrimethoxy silane (Gelest), and 0.992 g (4.28 mmol) of α,α,α',α'-tetramethyl-1,4-benzenedimethyl chloride initiator were added. Polymerization was initiated by addition of 4 and then 2 mL (54.71 mmol) of $TiCl_4$ (Aldrich). The polymerization temperature rose to −60.7° C. after 3 minutes. After a total reaction time of 45 minutes, the polymerization was terminated with 20 mL of anhydrous MeOH. The bottle was warmed to room temperature and purged with $N_2$ overnight. The product was the extracted 3×20 mL MeOH, and 21.4 g of anhydrous aliphatic plasticizer (a mixture of $C_{12}$–$C_{18}$ linear alkanes) and 0.642 g of 1-trimethyl siloxy-2,2-di(methylene trimethyl siloxy) butane was added. The remaining solvent was removed by vacuum distillation to yield a material with the following properties: $M_n=1.82\times10^4$ g/mol, $M_w=2.52\times10^4$ g/mol, PDI=1.38.

Compounding of Building Sealant

The polymers synthesized above were examined in a building sealant formulation and compared to commercially available Epion 505S (Kaneka) according to the following procedure:

Preparation of Hardener:

3.5 PHR tin octanoate, 0.75 PHR lauryl amine, 22 PHR calcium carbonate, 7 PHR aliphatic oil, and 2 PHR titanium oxide were added to a 2 L Planetary mixer. After 15 minutes of mixing at 40 RPM and 30° C., 5 PHR aliphatic oil was added and the components were mixed for 15 minutes under 13.3 Pa vacuum.

Preparation of Base Material

Examples 4–7 were mixed in a 2 L planetary mixer in the following manner. The polymer and calcium carbonate were added to a 2 L planetary mixer. This was mixed for 15 minutes at 40 RPM and 30° C. Then, 60 PHR aliphatic oil was added. After 15 minutes of mixing under 13.3 Pa vacuum at 40 RPM and 30° C., 5 PHR of Optiflo™ (Sud-Chemie AG) was added and mixing continued for 15 minutes under 34 kPa vacuum at 40 RPM and 30° C.

Preparation of Building Sealant

Just prior to shaping the building sealant, 361 PHR of base material and 40 PHR of hardener were hand mixed with a spatula for 5 minutes. The samples were then allowed to cure under ambient conditions for 24 hours. The tensile properties were then measured according to International Organization to Standardization (ISO) 8339:1984. The actual building sealants formed and their physical properties are described in the following table.

|  | Example 4 | Example 5 | Example 6 | Example 7 |
|---|---|---|---|---|
| Epion 505S | 150 | | | |
| PIB Polymer (Kaneka) | | | | |
| Example 1 | | 150 | | |
| Example 2 | | | 150 | |
| Example 3 | | | | 150 |
| Calcium Carbonate | 146 | 146 | 146 | 146 |
| Aliphatic Oil | 60 | 60 | 60 | 60 |
| Optiflo ™ | 5 | 5 | 5 | 5 |
| Total | 361 | 361 | 361 | 361 |
| Physical Properties | | | | |
| 50% Modulus ($N/cm^2$) | 7.8 | 18.6 | | |
| $T_b$ ($N/cm^2$) | 23.1 | 19.5 | 12 | 18.4 |
| $E_b$ (%) | 271 | 56 | 38 | 31 |

As can be seen from the Table, representative Examples 5–7 demonstrate that a curable polymer has been made with properties similar to the control. In addition, these properties may be varied significantly by choosing different $M_n$ and wt. % styrylalkyltrimethoxysilane.

The invention has been described with reference to a preferred embodiment. Obviously, modifications and alterations will occur to others upon reading and understanding the preceding, detailed description. It is intended that the invention be construed as including all such modifications and alterations insofar as they come within the scope of the appended claims or the equivalents thereof.

We claim:

1. A method for forming a polymer comprising initiating a polymerization of tertiary alkene monomers and vinyl aromatic hydrocarbon monomers, said vinyl aromatic hydrocarbon monomers having substituents of the formula $R^1SiR^2R^3R^4$, wherein $R^1$ links the silicon and said vinyl aromatic and is selected from methylene group, divalent hydrocarbon group having more than 6 carbon atoms, or divalent hydrocarbon group comprising one or more ether functional groups provided that any ether oxygen and the silicon are connected via at least one carbon atom, and $R^2$, $R^3$, and $R^4$ are one or more of hydrogen, alkyl, and alkoxy, with the proviso that no more than two may be hydrogen or alkyl.

2. The method of claim 1 wherein said polymerization is initiated by a cationic initiator system.

3. The method of claim 1 wherein said tertiary alkene is one or more of isobutylene, 2-methylbutene, 2-methylpentene, and 2-methylhexene.

4. The method of claim 1 wherein said $R^1$ is a methylene group, a divalent hydrocarbon group having 7 carbon atoms, a divalent hydrocarbon group having 8 carbon atoms, or a $C_1$–$C_8$ divalent hydrocarbon group comprising one or more ether functional groups.

5. The method of claim 1 wherein said $R^2$, $R^3$, and $R^4$ are independently selected from one or more of hydrogen, $C_1$–$C_{10}$ alkyl groups, methoxy, ethoxy, propoxy, butoxy, pentoxy, and alkoxy groups with up to 10 carbons in the alkyl portion, with the proviso that no more than two be hydrogen or alkyl.

6. The method of claim 2 wherein said cationic initiator system comprises a Lewis acid and alkyl halide.

7. The method of claim 6 wherein said Lewis acid is selected from $TiCl_4$, $BCl_3$, $AlCl_3$, $Et_2AlCl$, $EtAlCl_2$, and mixtures thereof.

8. The method of claim 6 wherein said alkyl halide comprises one or more of α,α,α',α' tetramethyl-1,4-benzenedimethyl chloride, t-butyl chloride, t-butyl bromide, 2-chloro-2-methylpentane, 2-bromo-2-methylpentane, 2-chloro-2-methylbutane, 2-chloro-2-phenylpropane, 2-bromo-2-phenylpropane, 1,3-(2-chloro-2-propyl)-5-t-butyl benzene, 1,3-(2-bromo-2-propyl)-5-t-butyl benzene and 2-bromo-2-methylbutane.

9. A method for forming a building sealant comprising:
   initiating cationic polymerization of tertiary alkene monomer units and vinyl aromatic hydrocarbon monomer units, said vinyl aromatic hydrocarbon monomer units having substituents of the formula $R^1SiR^2R^3R^4$, wherein $R^1$ links the silicon and said vinyl aromatic and is selected from methylene group, divalent hydrocarbon group having more than 6 carbon atoms, or divalent hydrocarbon group comprising one or more ether functional groups provided that any ether oxygen and the silicon are connected via at least one carbon atom, and $R^2$, $R^3$, and $R^4$ are one or more of hydrogen, alkyl, and alkoxy, with the proviso that no more than two may be hydrogen or alkyl, to form a sealant polymer, and combining said sealant polymer with a hardener.

10. The method of claim 9 wherein said polymerization is cationic and includes a Lewis acid.

11. The method of claim 10 wherein said Lewis acid comprises $TiCl_4$, $BCl_3$, $AlCl_3$, $Et_2AlCl$, $EtAlCl_2$, and mixtures thereof.

12. The method of claim 9 wherein said $R^1$ is a methylene groups, a divalent hydrocarbon group having 7 carbon atoms, a divalent hydrocarbon group having 8 carbon atoms, or a $C_1$–$C_8$ divalent hydrocarbon group comprising one or more ether functional groups.

13. The method of claim 9 wherein said $R^2$, $R^3$, and $R^4$ are independently selected from one or more of hydrogen, $C_1$–$C_{10}$ alkyl groups, methoxy, ethoxy, propoxy, butoxy, pentoxy, and alkoxy groups with up to 10 carbons in the alkyl portion, with the proviso that no more than two be hydrogen or alkyl.

14. The method of claim 9 wherein said hardener comprises a tin or amine containing compound.

15. A method for forming a polymer comprising initiating a polymerization of tertiary alkene monomers and vinyl aromatic hydrocarbon monomers, said vinyl aromatic hydrocarbon monomers having substituents of the formula $SiR^2R^3R^4$, wherein the silicon is directly bonded to said vinyl aromatic and $R^2$, $R^3$, and $R^4$ are one or more of hydrogen, alkyl, and alkoxy, with the proviso that no more than two may be hydrogen or alkyl.

* * * * *